(12) United States Patent
Connolly et al.

(10) Patent No.: US 8,797,823 B2
(45) Date of Patent: Aug. 5, 2014

(54) IMPLEMENTING SDRAM HAVING NO RAS TO CAS DELAY IN WRITE OPERATION

(71) Applicant: International Business Machines Corporation, Armonk, NY (US)

(72) Inventors: Brian J. Connolly, Williston, VT (US); Kyu-hyoun Kim, Mount Kisco, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 13/658,226

(22) Filed: Oct. 23, 2012

(65) Prior Publication Data
US 2014/0112063 A1    Apr. 24, 2014

(51) Int. Cl.
*G11C 8/18* (2006.01)
*G06F 17/50* (2006.01)

(52) U.S. Cl.
USPC ............ 365/233.16; 365/233.17; 365/233.19; 365/193; 365/194; 365/203; 365/227; 716/103; 716/119

(58) Field of Classification Search
USPC ............ 365/233.13, 233.16, 233.17, 233.19, 365/233.1, 193, 194, 191, 203, 227, 226; 716/103, 101, 106, 118, 119
See application file for complete search history.

(56) References Cited

U.S. PATENT DOCUMENTS

| | | | | |
|---|---|---|---|---|
| 5,544,124 | A * | 8/1996 | Zagar et al. | 365/230.08 |
| 6,085,300 | A * | 7/2000 | Sunaga et al. | 711/168 |
| 6,693,835 | B2 * | 2/2004 | Protzman et al. | 365/204 |
| 6,930,939 | B2 * | 8/2005 | Lim et al. | 365/203 |
| 6,963,516 | B2 | 11/2005 | Blackmon et al. | |
| 2007/0038803 | A1 | 2/2007 | Hang | |
| 2011/0055451 | A1 | 3/2011 | Ware et al. | |
| 2012/0069692 | A1 | 3/2012 | Taruishi et al. | |

FOREIGN PATENT DOCUMENTS

| | | |
|---|---|---|
| JP | 404230544 | 8/1992 |
| KR | 2004038449 | 5/2004 |

OTHER PUBLICATIONS

Yamazaki, Akira et al., "WP 24.2 A 56.8GB/s 0.18μm Embedded DRAM Macro with Dual Port Sense Amplifier for 3D Graphics Controller", 2000.

* cited by examiner

*Primary Examiner* — Andrew Q Tran
(74) *Attorney, Agent, or Firm* — Joan Pennington

(57) ABSTRACT

A method and circuit for implementing faster-cycle-time and lower-energy write operations for Synchronous Dynamic Random Access Memory (SDRAM), and a design structure on which the subject circuit resides are provided. A first RAS (row address strobe) to CAS (column address strobe) command delay (tRCD) is provided to the SDRAM for a read operation. A second delay tRCD is provided for a write operation that is substantially shorter than the first delay tRCD for the read operation.

19 Claims, 11 Drawing Sheets

IMPLEMENTING SDRAM HAVING NO RAS TO CAS DELAY IN WRITE OPERATION

FIELD OF THE INVENTION

The present invention relates generally to the data processing field, and more particularly, relates to a method and circuit for implementing faster-cycle-time and lower-energy write operations for Synchronous Dynamic Random Access Memory (SDRAM), by substantially eliminating RAS (row address strobe) to CAS (column address strobe) command delay for write operations, and a design structure on which the subject circuit resides.

DESCRIPTION OF THE RELATED ART

As computers and computer processors increase in performance, memory access performance can become a significant bottleneck on overall system performance. The interface technology utilized to communicate data between a memory device and memory controller or other form of application device in particular can be a significant source of such a bottleneck.

Dynamic random access memory chips (DRAMs) are commonly used memory components. Synchronous Dynamic Random Access Memory (SDRAM) is DRAM that is synchronized with the system bus.

Conventional Dynamic Random Access Memory (DRAM) includes substantially the same RAS (row address strobe) to CAS (column address strobe) command delay (tRCD) for both a read operation and a write operation.

FIG. 1A illustrates a prior art SDRAM read operation. An external read command includes an activate (ACT) command followed by a RAS to CAS command delay tRCD, the read (RD) command, a precharge (PRE) at the conclusion of the read operation followed by a row precharge delay before another activate (ACT) command. A plurality of illustrated conventional internal DRAM node read signals includes WL (wordline), BL, /BL (bitlines), CSL (column select line), IO, /IO (input/output data) and DQ (data lines). As shown, a latency for the conventional read operation or cycle time (tRC_RD=tRCD+tRP, where tRCD equals cycle time for the RAS to CAS command delay, and tRP equals cycle time for a precharge delay.

FIG. 1B illustrates a prior art SDRAM write operation with an external write command including an activate (ACT) signal followed by the RAS to CAS command delay tRCD, the write (WR) command, a precharge (PRE) and activate (ACT). The plurality of illustrated conventional internal DRAM node write signals includes WL (wordline), BL, /BL (bitlines), CSL (column select line), IO (input/output lines) and DQ (data lines). As shown, a latency for the conventional write operation or cycle time (tRC_WR(old)=tRCD+CWL+BL/2+tWR+tRP, where tRCD equals cycle time for the RAS to CAS command delay, CWL equals wordline cycle time, BL/2 equals bitline cycle time divided by 2, tWR equals cycle time for write recovery, and tRP equals cycle time for a precharge delay.

A need exists for a circuit having an efficient and effective mechanism for implementing faster-cycle-time and lower-energy write operations for SDRAM.

SUMMARY OF THE INVENTION

Principal aspects of the present invention are to provide a method and circuit for implementing faster-cycle-time and lower-energy write operations for SDRAM, and a design structure on which the subject circuit resides. Other important aspects of the present invention are to provide such method, circuit and design structure substantially without negative effects and that overcome many of the disadvantages of prior art arrangements.

In brief, a method and circuit for implementing faster-cycle-time and lower-energy write operations for Synchronous Dynamic Random Access Memory (SDRAM), and a design structure on which the subject circuit resides are provided. A first RAS (row address strobe) to CAS (column address strobe) command delay (tRCD) is provided to the SDRAM for a read operation. A second delay tRCD is provided for a write operation that is substantially shorter than the first delay tRCD for the read operation.

In accordance with features of the invention, the second delay tRCD is, for example, zero or one clock cycle.

In accordance with features of the invention, a memory controller for read and write operations applies different command delays tRCD.

In accordance with features of the invention, with additive latency (AL) enabled, where AL>0, the SDRAM delays a read command by the AL, while a write command is not delayed by the AL.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuit for implementing faster-cycle-time and lower-energy write operations for Synchronous Dynamic Random Access Memory (SDRAM), and a design structure on which the subject circuit resides are provided.

Figure 1A:
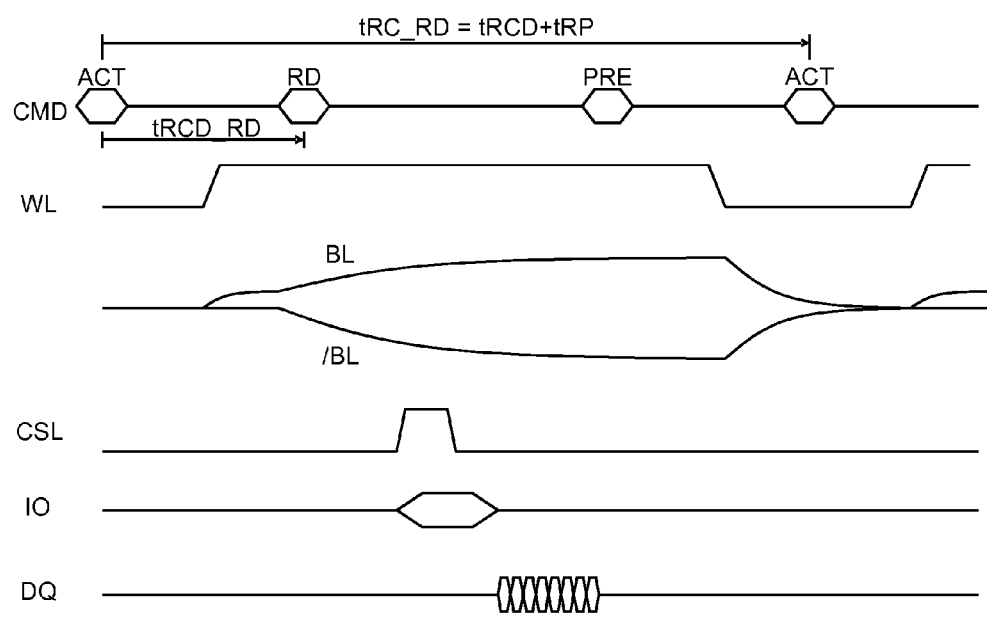
FIGS. 1A and 1B respectively illustrate a prior art SDRAM read operation and a prior art SDRAM write operation.
Figure 1B:
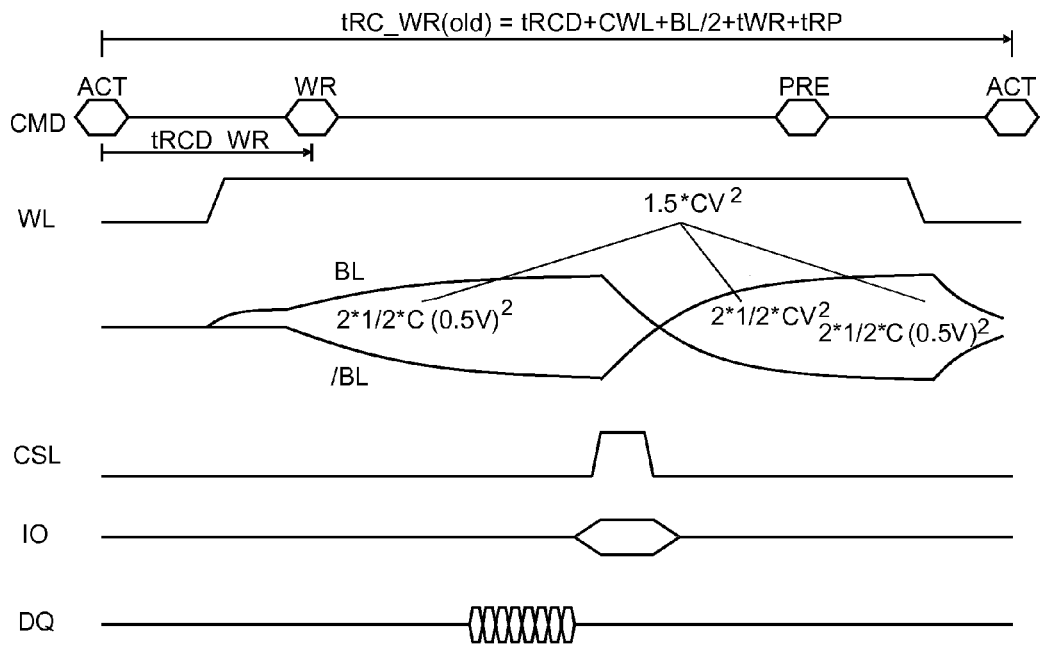
Figure 2:
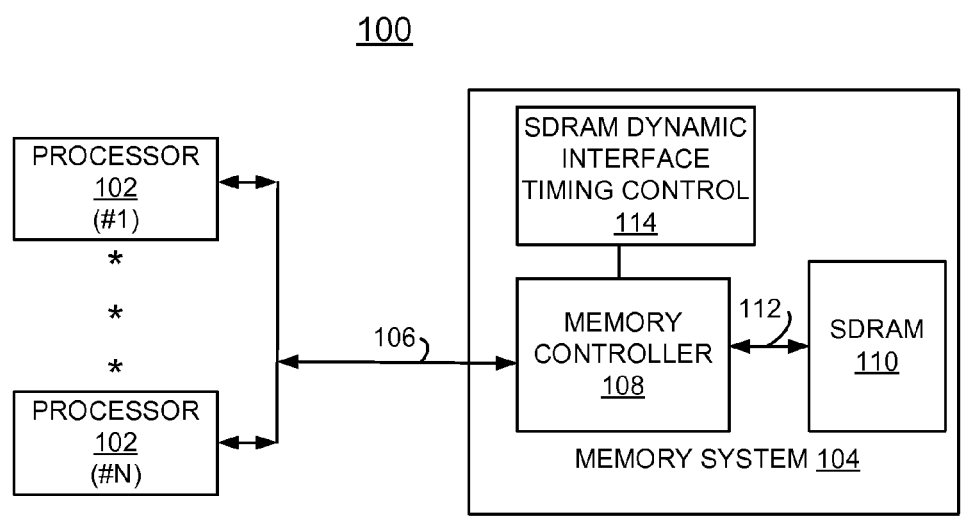
FIG. 2 is a block diagram representation illustrating a computer system for implementing faster-cycle-time and lower-energy write operations for Synchronous Dynamic Random Access Memory (SDRAM) in accordance with a preferred embodiment.

Having reference now to the drawings, in FIG. 2, there is shown a computer system generally designated by the reference character 100 for implementing faster-cycle-time and lower-energy write operations for Synchronous Dynamic Random Access Memory (SDRAM) in accordance with a preferred embodiment. Computer system 100 includes a plurality of processors 102 or central processor units (CPUs) 102 coupled to a memory system 104 by a system bus 106. Memory system 104 includes a memory controller 108 coupled to processors 102 by the system bus 106 and a SDRAM 110 by a memory interface or bus 112. Memory system 104 includes a SDRAM dynamic interface timing control 114 coupled to the memory controller 108.

SDRAM dynamic interface timing control 114 includes control code stored on a computer readable medium, with the memory controller 108 using the control code for implementing faster-cycle-time and lower-energy write operations for Synchronous Dynamic Random Access Memory (SDRAM) in accordance with a preferred embodiment.

Computer system 100 is shown in a form sufficient for understanding the present invention. The illustrated computer system 100 is not intended to imply architectural or functional limitations. The present invention can be used with various hardware implementations and systems and various other internal hardware devices. It should be understood that the present invention is not limited to use in the illustrated computer system 100, various processor and memory systems can provide a memory environment in which the methods and enhanced faster-cycle-time and lower-energy write operations for SDRAM of the preferred embodiments of the invention advantageously are implemented.

Referring to FIGS. 3, 4, 5, and 6, there are shown are timing diagrams respectively illustrating faster-cycle-time and lower-energy write operations for Synchronous Dynamic Random Access Memory (SDRAM) in accordance with a preferred embodiment. In FIGS. 3, 4, 5, and 6, a plurality of illustrated internal DRAM node write signals includes WL (wordline), BL, /BL (bitlines), CSL (column select line), (input/output lines) and DQ (data lines).

Figure 3:
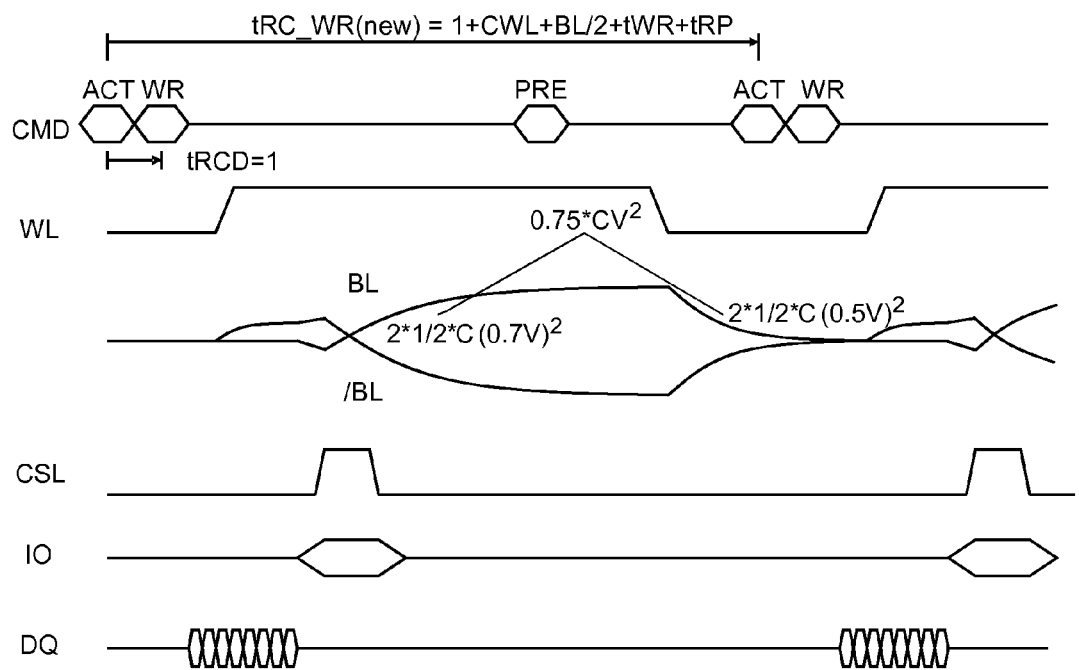
FIGS. 3, 4, 5, and 6 are timing diagrams respectively illustrating faster-cycle-time and lower-energy write operations for Synchronous Dynamic Random Access Memory (SDRAM) in accordance with a preferred embodiment.

In FIG. 3, a new SDRAM write operation is illustrated with an external write command including an activate (ACT) signal followed by the write (WR) with the RAS to CAS command delay tRDC equal to 1 (tRDC=1), a precharge (PRE) and activate (ACT) followed by a next write (WR). As shown, a latency for the write operation or cycle time (tRC_WR(new)=1+CWL+BL/2+tWR+tRP, where 1 represents the RAS (row address strobe) to CAS (column address strobe) command delay tRCD, CWL equals wordline cycles, BL/2 equals bitline cycles divided by 2, tWR equals cycle time for write recovery, and tRP equals cycle time for precharge delay.

Figure 4:
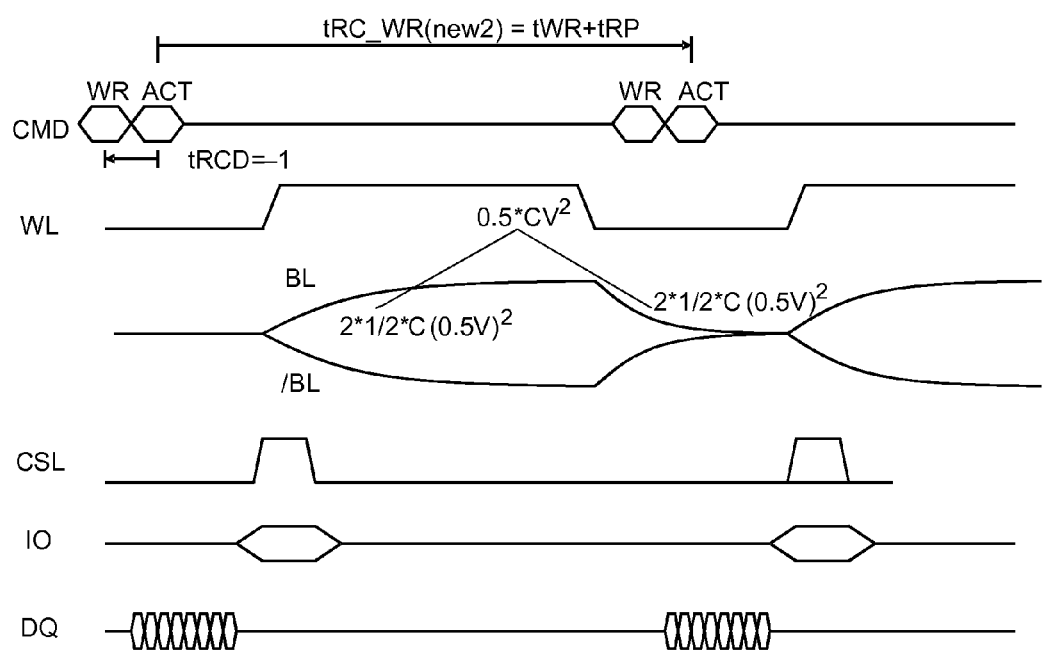

In FIG. 4, a second new SDRAM write operation is illustrated with an external write command including the write (WR) followed by an activate (ACT) signal and command delay tRDC equal to negative one clock signal (tRDC=−1), and a next write (WR)) followed by activate (ACT). As shown, the second (new2) SDRAM write operation cycle time (tRC_WR(new2)=+tWR+tRP, where tWR equals cycle time for write recovery, and tRP equals cycle time for precharge delay.

Figure 5:
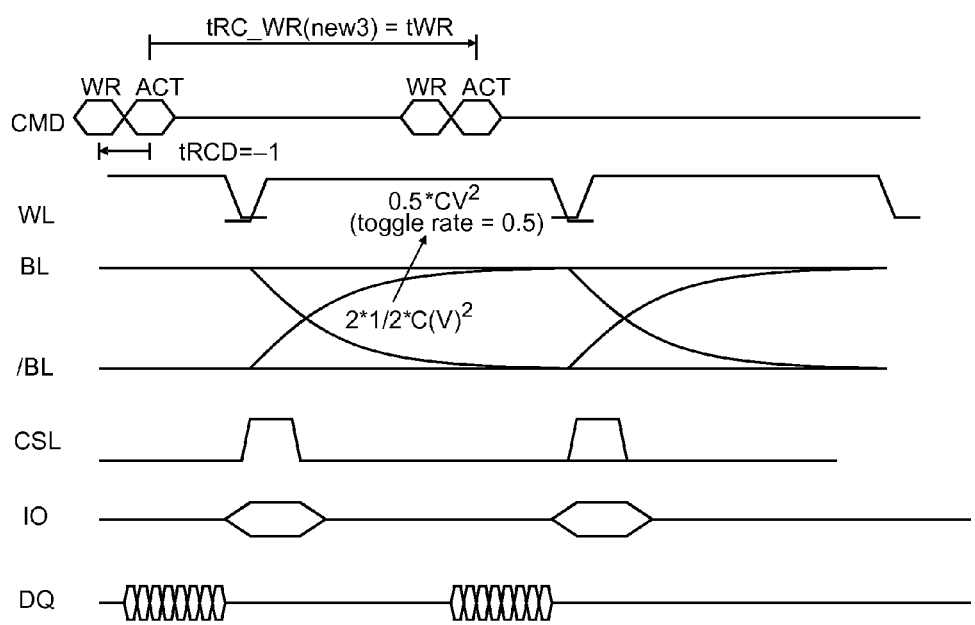

In FIG. 5, a third new SDRAM write operation is illustrated with an external write command including the write (WR) followed by an activate (ACT) signal and command delay tRDC equal to negative one clock signal (tRDC=−1), and a next write (WR) followed by activate (ACT). As shown, the third (new3) SDRAM write operation cycle time (tRC_WR(new3)=tWR, where tWR equals cycle time for write recovery.

Figure 6:
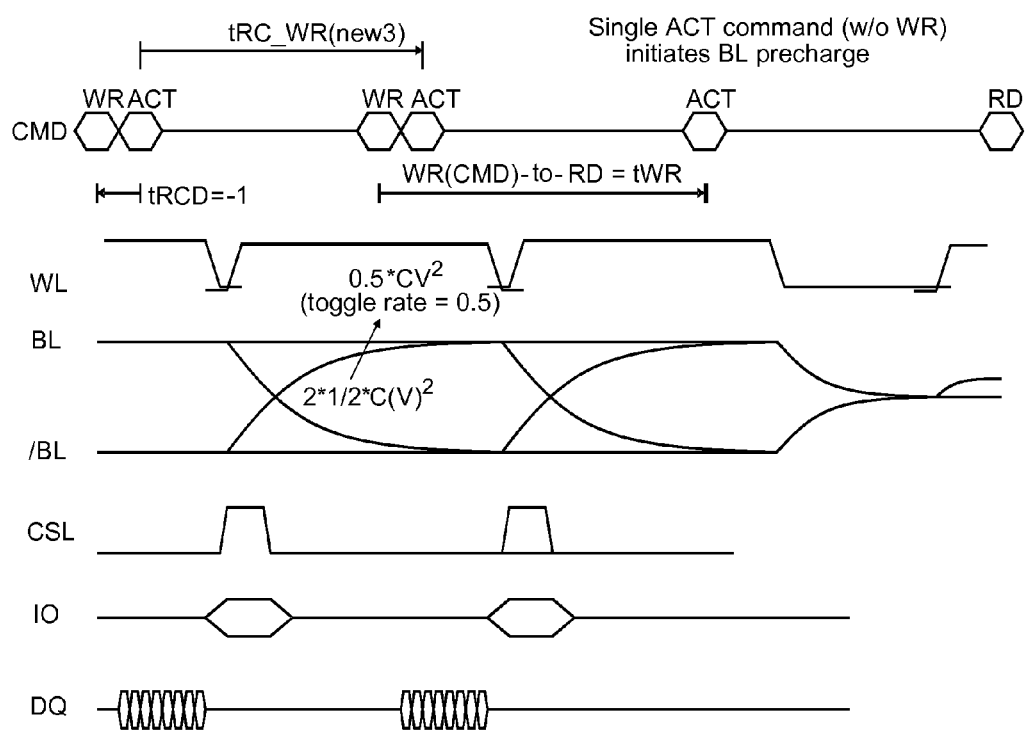

In FIG. 6, a third new 3 SDRAM write operation followed by a single activate (ACT) without the write (WR) is illustrated. In FIG. 6, an external write command including the write (WR) followed by an activate (ACT) signal and command delay tRDC equal to negative one clock signal (tRDC=−1), and a next write (WR) followed by activate (ACT) followed by a single activate (ACT) without write (WR) with the single activate (ACT) for a read operation. As shown, the third (new3) SDRAM write operation cycle time (tRC_WR(new3)=tWR, where tWR equals cycle time for write recovery; and the third SDRAM write operation to read command cycle time (WR(CMD)-to-RD=tWR, where tWR equals cycle time for write recovery.

Figure 7:
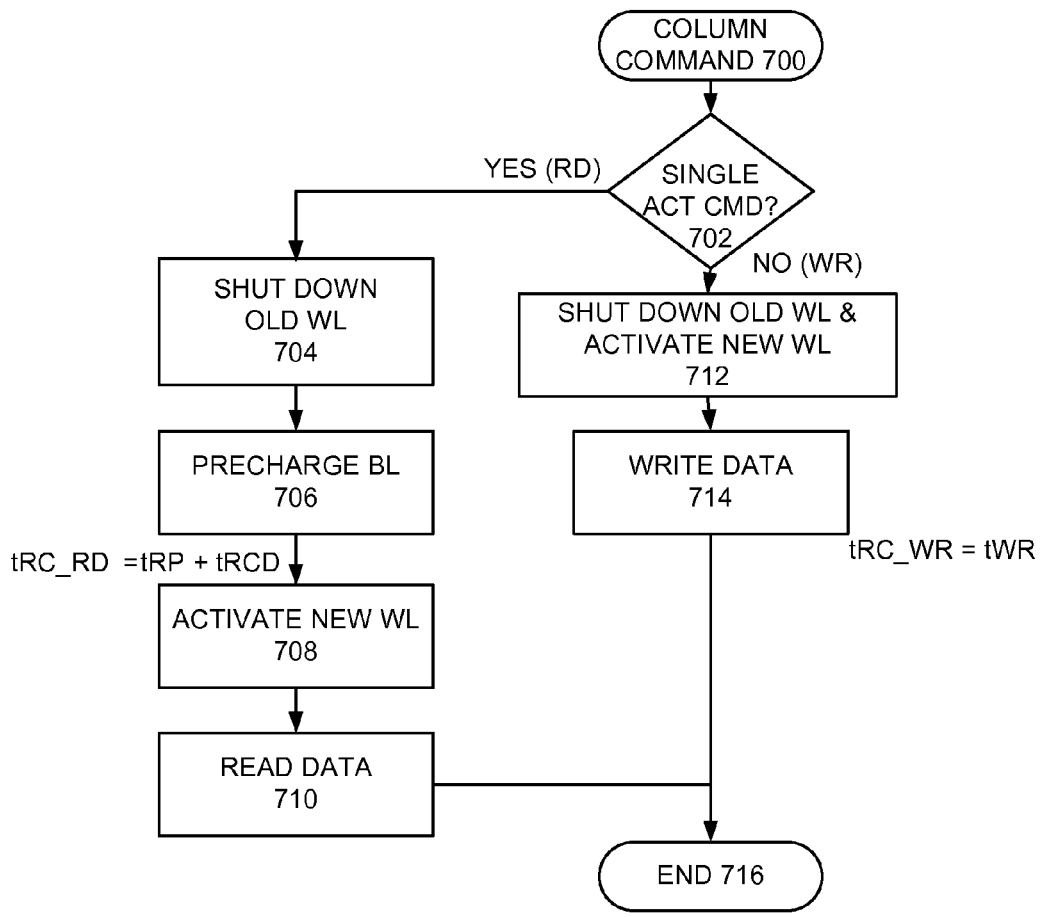
FIGS. 7 and 8 are flow charts respectively illustrating exemplary steps for implementing read operations and faster-cycle-time and lower-energy write operations for Synchronous Dynamic Random Access Memory (SDRAM) in accordance with a preferred embodiment.
Figure 8:
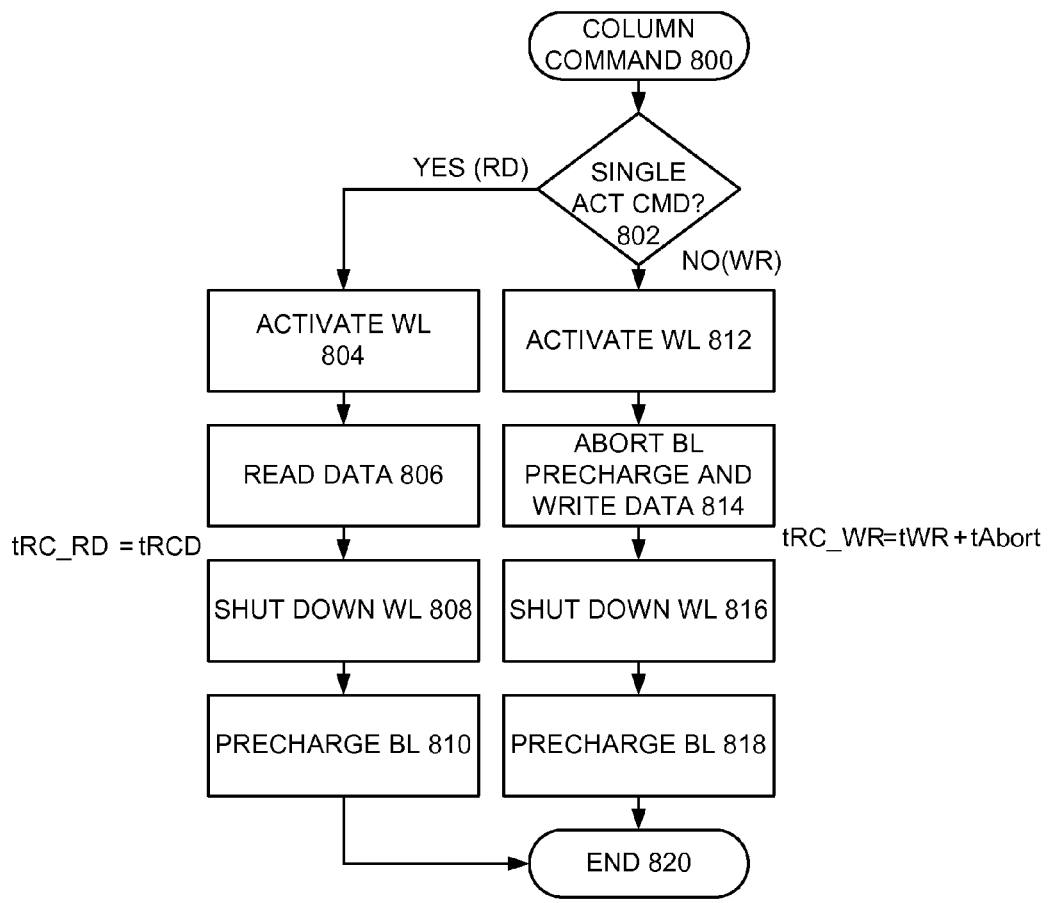

FIGS. 7 and 8 are flow charts respectively illustrating exemplary steps for implementing read operations and faster-cycle-time and lower-energy write operations for Synchronous Dynamic Random Access Memory (SDRAM) in accordance with a preferred embodiment.

In FIG. 7, exemplary steps for policy implementing a read operation and write operation with an SDRAM open page policy are shown. With the SDRAM open page policy, a DRAM precharge operation is not performed and a row maintains active state. A column command is received by the SDRAM as indicated at a block 700. Checking for a single activate command (ACT CMD) to identify a read command or a write command is performed as indicated at a decision block 702. When a read command is identified at decision block 702, the old wordline WL is shut down as indicated at a block 704, then the bitline BL is precharged as indicated at a block 706. As shown, a latency for the read operation or cycle time (tRC_RD=tRP+tRCD, where tRP equals cycle time for a precharge delay and tRCD is the RAS (row address strobe) to CAS (column address strobe) command delay. A new wordline WL is activated as indicated at a block 708, then the data is read as indicated at a block 710.

When a write command is identified at decision block 702, the old wordline WL is shut down and a new wordline WL is activated as indicated at a block 712. Then the data is written as indicated at a block 714. As shown, a latency for the write operation or cycle time (tRC_WR=tWR, where tWR equals cycle time for write recovery. After the read operation or write operation, the operations end as indicated at a block 716.

In FIG. 8, exemplary steps for policy implementing a read operation and write operation with an SDRAM closed page policy are shown. A column command is received by the SDRAM as indicated at a block 800. Checking for a single activate command (ACT CMD) to identify a read command or a write command is performed as indicated at a decision block 802. When a read command is identified at decision block 802, the wordline WL is activated as indicated at a block 804, then the data is read as indicated at a block 806. Then the wordline WL is shut down as indicated at a block 808, and the bitline BL is precharged as indicated at a block 810. As shown, a latency for the read operation or cycle time (tRC_RD=tRCD, where tRCD is the RAS (row address strobe) to CAS (column address strobe) command delay.

When a write command is identified at decision block 802, the wordline WL is activated as indicated at a block 812, and a bitline precharge is aborted and data is written as indicated at a block 814. The wordline WL is shut down as indicated at a block 816, and the bitline is precharged as indicated at a block 818. As shown, a latency for the write operation or cycle time (tRC_WR=tWR+tAbort, where tWR equals cycle time for write recovery, and tAbort, guarantees non-overlap between precharge stop and beginning of write data driving, which can be very short, such as approximately 1 ns. After the read operation or write operation, the operations end as indicated at a block 820.

Figure 9:
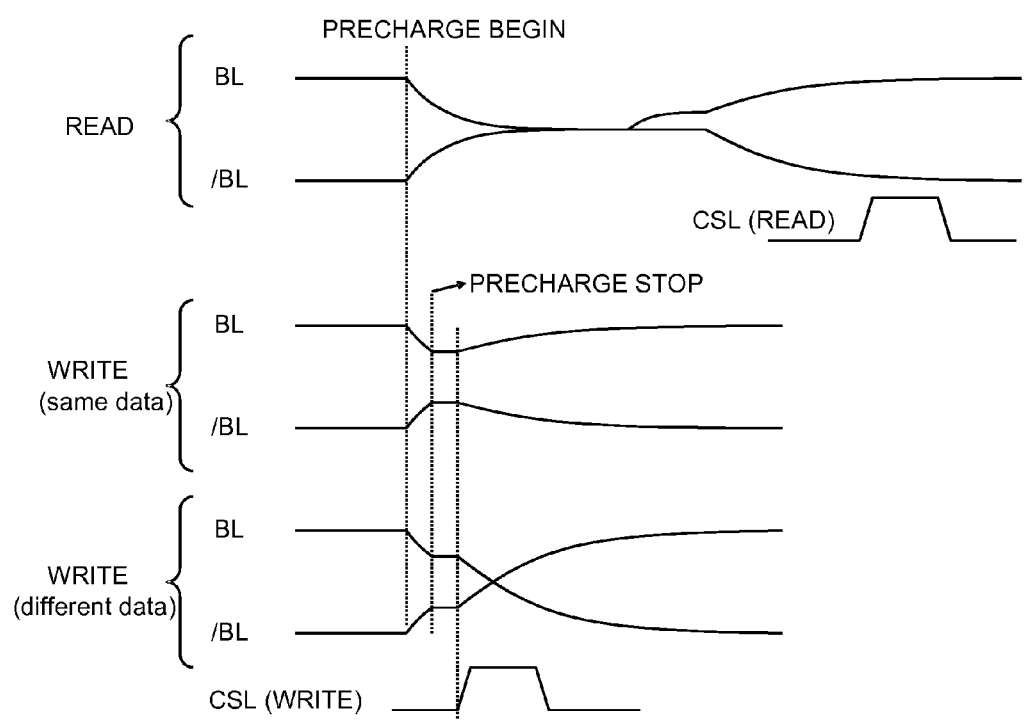
FIG. 9 is a timing diagram illustrating bitline (BL) waveforms for a read operation and faster-cycle-time and lower-energy write operations for Synchronous Dynamic Random Access Memory (SDRAM) in accordance with a preferred embodiment.

FIG. 9 is a timing diagram illustrating bitline (BL) waveforms for a read operation and faster-cycle-time and lower-energy write operations for Synchronous Dynamic Random Access Memory (SDRAM) in accordance with a preferred embodiment. As shown in FIG. 9, for the read operation the column select line CSL(READ) includes required delay following the start of precharge indicated at a line PRECHARGE BEGIN. For the write operation with same data and different data the column select line CSL(WRITE) includes small delay following the stop of precharge indicated at a line PRECHARGE STOP.

Figure 10:
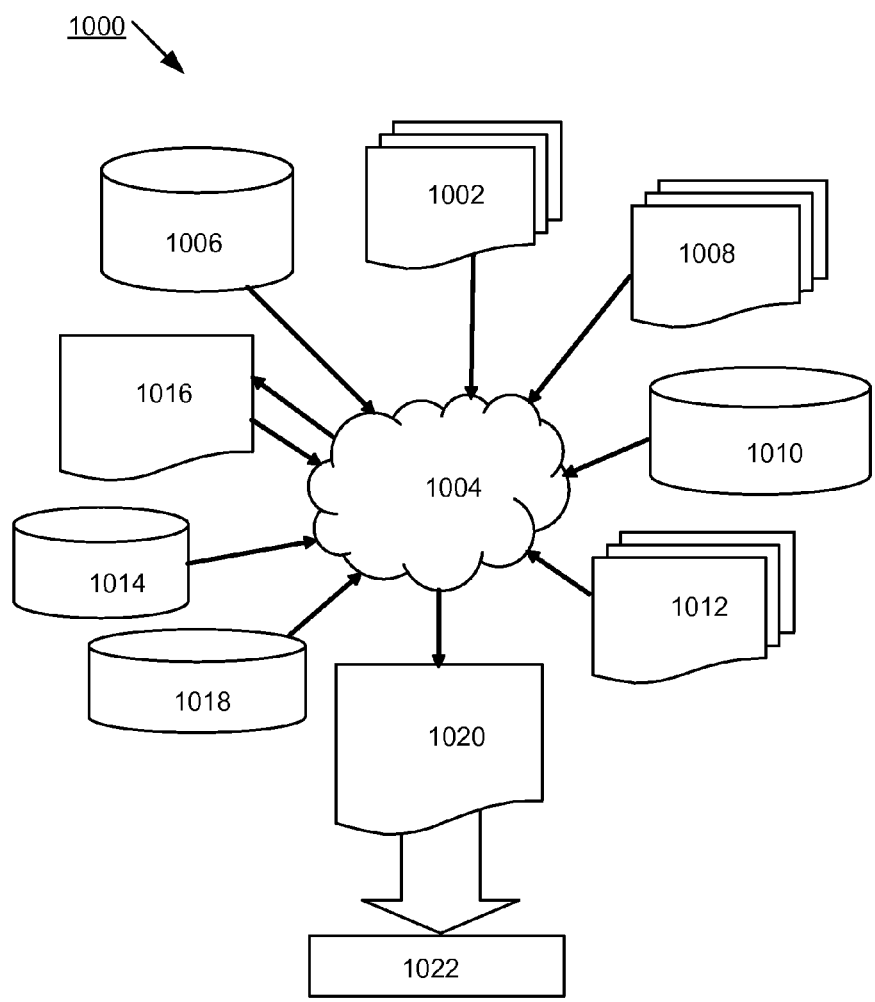
FIG. 10 is a flow diagram of a design process used in semiconductor design, manufacturing, and/or test.

FIG. 10 is a flow diagram of a design process used in semiconductor design, manufacturing, and/or test. FIG. 10 shows a block diagram of an example design flow 1000. Design flow 1000 may vary depending on the type of IC being designed. For example, a design flow 1000 for building an application specific IC (ASIC) may differ from a design flow 1000 for designing a standard component. Design structure 1002 is preferably an input to a design process 1004 and may come from an IP provider, a core developer, or other design company or may be generated by the operator of the design flow, or from other sources. Design structure 1002 comprises circuit 100 in the form of schematics or HDL, a hardware-description language, for example, Verilog, VHDL, C, and the like. Design structure 10010 may be contained on one or more machine readable medium. For example, design structure 10010 may be a text file or a graphical representation circuit 100. Design process 1004 preferably synthesizes, or translates, circuit 100 into a netlist 1006, where netlist 1006 is, for example, a list of wires, transistors, logic gates, control circuits, I/O, models, etc. that describes the connections to other elements and circuits in an integrated circuit design and recorded on at least one of machine readable medium. This may be an iterative process in which netlist 1006 is resynthesized one or more times depending on design specifications and parameters for the circuit.

Design process 1004 may include using a variety of inputs; for example, inputs from library elements 1004 which may house a set of commonly used elements, circuits, and devices, including models, layouts, and symbolic representations, for a given manufacturing technology, such as different technology nodes, 410 nm, 45 nm, 90 nm, and the like, design specifications 1010, characterization data 1012, verification data 1014, design rules 1016, and test data files 1018, which may include test patterns and other testing information. Design process 1004 may further include, for example, standard circuit design processes such as timing analysis, verification, design rule checking, place and route operations, and the like. One of ordinary skill in the art of integrated circuit design can appreciate the extent of possible electronic design automation tools and applications used in design process 1004 without deviating from the scope and spirit of the invention. The design structure of the invention is not limited to any specific design flow.

Design process 1004 preferably translates embodiments of the invention as shown in FIGS. 2, 7, and 8, along with any additional integrated circuit design or data (if applicable), into a second design structure 1020. Design structure 1020 resides on a storage medium in a data format used for the exchange of layout data of integrated circuits, for example, information stored in a GDSII (GDS10), GL1, OASIS, or any other suitable format for storing such design structures. Design structure 1020 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 2, 7, and 8. Design structure 1020 may then proceed to a stage 1022 where, for example, design structure 1020 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing faster-cycle-time and lower-energy write operations for Synchronous Dynamic Random Access Memory (SDRAM) comprising:
 a memory controller coupled to the SDRAM;
 said memory controller providing a first RAS (row address strobe) to CAS (column address strobe) command delay (tRCD) to the SDRAM for a read operation; and
 said memory controller providing a second delay tRCD for a write operation; said second delay tRCD being substantially shorter than said first delay tRCD for said read operation.

2. The circuit as recited in claim 1 wherein said second delay tRCD includes zero clock cycles.

3. The circuit as recited in claim 1 wherein said second delay tRCD includes one clock cycle.

4. The circuit as recited in claim 1 wherein said second delay tRCD includes negative one clock cycle.

5. The circuit as recited in claim 1 wherein said column address strobe command includes additive latency greater than zero; said read operation being delayed by said additive latency.

6. The circuit as recited in claim 5 wherein said write operation not being delayed by said additive latency.

7. The circuit as recited in claim 1 wherein said write operation including an activate (ACT) command without a write command, said activate (ACT) command initiating a bitline precharge in the SDRAM.

8. The circuit as recited in claim 1 includes control code stored on a computer readable medium, and wherein said memory controller using said control code for implementing faster-cycle-time and lower-energy write operations for Synchronous Dynamic Random Access Memory (SDRAM).

9. A design structure embodied in a machine readable medium used in a design process, the design structure comprising:
 a circuit tangibly embodied in the machine readable medium used in the design process, said circuit for implementing faster-cycle-time and lower-energy write operations for Synchronous Dynamic Random Access Memory (SDRAM), said circuit comprising:

a memory controller coupled to the SDRAM;

said memory controller providing a first RAS (row address strobe) to CAS (column address strobe) command delay (tRCD) to the SDRAM for a read operation; and said memory controller providing a second delay tRCD for a write operation; said second delay tRCD being substantially shorter than said first delay tRCD for said read operation.

10. The design structure of claim 9, wherein the design structure comprises a netlist, which describes said circuit.

11. The design structure of claim 9, wherein the design structure resides on storage medium as a data format used for the exchange of layout data of integrated circuits.

12. The design structure of claim 9, wherein the design structure includes at least one of test data files, characterization data, verification data, or design specifications.

13. The design structure of claim 9, wherein said second delay tRCD selectively includes one of zero clock cycles, one clock cycle and negative one clock cycle.

14. The design structure of claim 9, wherein said column address strobe command includes additive latency greater than zero; said read operation being delayed by said additive latency, said write operation not being delayed by said additive latency.

15. A method for implementing faster-cycle-time and lower-energy write operations for Synchronous Dynamic Random Access Memory (SDRAM) comprising:

providing a first RAS (row address strobe) to CAS (column address strobe) command delay (tRCD) to the SDRAM for a read operation; and providing a second delay tRCD for a write operation; said second delay tRCD being substantially shorter than said first delay tRCD for said read operation.

16. The method as recited in claim 15 wherein providing said first RAS (row address strobe) to CAS (column address strobe) command delay (tRCD) to the SDRAM for said read operation and providing said second delay tRCD for said write operation includes providing a memory controller coupled to the SDRAM.

17. The method as recited in claim 16 includes providing control code stored on a computer readable medium, and wherein said memory controller using said control code for implementing faster-cycle-time and lower-energy write operations for Synchronous Dynamic Random Access Memory (SDRAM).

18. The method as recited in claim 15 includes enabling additive latency with said column address strobe command and includes providing said read operation delayed by said additive latency.

19. The method as recited in claim 18 includes providing said write operation not being delayed by said additive latency.

* * * * *